US009694696B2

(12) United States Patent
Kumazawa et al.

(10) Patent No.: US 9,694,696 B2
(45) Date of Patent: Jul. 4, 2017

(54) POWER SUPPLY DEVICE OF VEHICLE

(71) Applicant: TOYOTA JIDOSHA KABUSHIKI KAISHA, Toyota-shi, Aichi-ken (JP)

(72) Inventors: Suguru Kumazawa, Toyota (JP); Hideki Kamatani, Nagoya (JP); Ryoji Sato, Toyohashi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/107,130

(22) PCT Filed: Dec. 2, 2014

(86) PCT No.: PCT/JP2014/006022
§ 371 (c)(1),
(2) Date: Jun. 22, 2016

(87) PCT Pub. No.: WO2015/097993
PCT Pub. Date: Jul. 2, 2015

(65) Prior Publication Data
US 2017/0036554 A1 Feb. 9, 2017

(30) Foreign Application Priority Data

Dec. 24, 2013 (JP) ................. 2013-265625

(51) Int. Cl.
*H02P 27/04* (2016.01)
*B60L 11/18* (2006.01)
(Continued)

(52) U.S. Cl.
CPC ........ *B60L 11/1803* (2013.01); *B60L 3/0084* (2013.01); *B60W 10/08* (2013.01);
(Continued)

(58) Field of Classification Search
CPC .. H02P 27/04; H02P 27/06; H02P 1/18; H02P 1/46; H02P 3/18; H02P 27/14
(Continued)

(56) References Cited

U.S. PATENT DOCUMENTS 8,311,691 B2 * 11/2012 Matsumoto ............. B60L 3/003
165/42
8,443,779 B2 * 5/2013 Mitsutani ............... B60K 6/445
123/198 D
(Continued)

FOREIGN PATENT DOCUMENTS

JP 2008-199769 8/2008
JP 2010-239791 10/2010
(Continued)

*Primary Examiner* — Antony M Paul
(74) *Attorney, Agent, or Firm* — Finnegan, Henderson, Farabow, Garrett & Dunner, LLP

(57) ABSTRACT

A control device controls a boost converter to be operated in one of a continuous voltage-boosting mode in which the converter is continuously operated and in an intermittent voltage-boosting mode in which the converter is intermittently operated. The control device permits the converter to be controlled in the intermittent voltage-boosting mode when an atmospheric pressure is equal to or greater than a first prescribed value, and inhibits the converter from being controlled in the intermittent voltage-boosting mode when the atmospheric pressure is less than the first prescribed value.

3 Claims, 11 Drawing Sheets

(51) Int. Cl.
*B60W 20/15* (2016.01)
*B60W 10/08* (2006.01)
*B60L 3/00* (2006.01)
*H02P 27/06* (2006.01)

(52) U.S. Cl.
CPC ............. *B60W 20/15* (2016.01); *H02P 27/06* (2013.01); *B60L 2210/14* (2013.01); *B60Y 2200/92* (2013.01); *Y10S 903/906* (2013.01)

(58) Field of Classification Search
USPC ......... 318/139, 400.01, 400.14, 400.15, 700, 318/701, 727, 800, 801; 363/23, 34, 40, 363/95, 144, 120, 162, 164, 174, 175; 320/116, 127, 137
See application file for complete search history.

(56) References Cited

U.S. PATENT DOCUMENTS

| | | |
|---|---|---|
| 2009/0198397 A1 | 8/2009 | Matsumoto |
| 2010/0026311 A1 | 2/2010 | Mitsutani |
| 2012/0187887 A1 | 7/2012 | Sone |

FOREIGN PATENT DOCUMENTS

| | | |
|---|---|---|
| JP | 2011-15603 | 1/2011 |
| JP | 2012-152079 | 8/2012 |

\* cited by examiner

POWER SUPPLY DEVICE OF VEHICLE

TECHNICAL FIELD

The present invention relates to a power supply device of a vehicle.

BACKGROUND ART

Japanese Patent Laying-Open No. 2010-239791 (PTL 1) discloses a technique of setting, as a limit voltage, a voltage that tends to decrease as the atmospheric pressure becomes smaller (the altitude becomes higher), and using the set limit voltage to set a target voltage to be supplied to an inverter, thereby controlling a boost converter. According to this technique, even if the withstand voltage of loading components such as an electric motor is decreased due to a relative low atmospheric pressure, it becomes possible to prevent a dielectric breakdown from occurring in these loading components such as an electric motor.

CITATION LIST

Patent Literature

PTL 1: Japanese Patent Laying-Open No. 2010-239791
PTL 2: Japanese Patent Laying-Open No. 2011-015603

SUMMARY OF INVENTION

Technical Problem

When an electric motor consumes less current, the operation of a boost converter is intermittently started and stopped. Thereby, in the case where intermittent voltage-boosting control for reducing power loss is performed, the output voltage of the boost converter deviates from a command voltage over time while voltage boosting is stopped.

Assume that the limit voltage is set in accordance with the atmospheric pressure as disclosed in PTL 1. If an atmospheric pressure is relatively low, however, when the output voltage of the boost converter increases due to a deviation between the output voltage of the boost converter and the command voltage during discontinuation of voltage boosting, insulation short circuit occurs in loading components such as an electric motor.

Therefore, an object of the present invention is to provide a power supply device of a vehicle that can prevent dielectric breakdown from occurring in a loading component connected to a boost converter under an environment in which an atmospheric pressure is relatively low.

Solution to Problem

In order to solve the problem as described above, a power supply device of a vehicle according to the present invention includes: a power storage device; an electric motor; a boost converter connected to the power storage device and the electric motor, boosting a voltage of the power storage device, and supplying the boosted voltage to the electric motor; and a control device controlling the boost converter to be operated in one of a continuous voltage-boosting mode in which the boost converter is continuously operated and an intermittent voltage-boosting mode in which the boost converter is intermittently operated. The control device permits the boost converter to be controlled in the intermittent voltage-boosting mode when an atmospheric pressure is equal to or greater than a first prescribed value, and inhibits the boost converter from being controlled in the intermittent voltage-boosting mode when the atmospheric pressure is less than the first prescribed value.

Accordingly, when the atmospheric pressure is less than the first prescribed value, the boost converter is not controlled in the intermittent voltage-boosting mode. Consequently, the output voltage of the boost converter does not increase during discontinuation of voltage boosting in the intermittent voltage-boosting mode, so that insulation short circuit can be prevented from occurring in loading components such as an electric motor.

Preferably, when a difference between an output voltage of the boost converter and a command voltage of the output voltage of the boost converter is equal to or greater than a threshold value during discontinuation of voltage boosting by the boost converter in the intermittent voltage-boosting mode, the control device causes the boost converter to resume voltage boosting. When the atmospheric pressure is equal to or greater than a second prescribed value that is greater than the first prescribed value, the control device sets the threshold value at a fixed value. When the atmospheric pressure falls within a range of the first prescribed value or more and less than the second prescribed value, the control device sets the threshold value at a value that is equal to or less than the fixed value and decreases as the atmospheric pressure decreases.

Accordingly, when the atmospheric pressure is less than the second prescribed value and equal to or greater than the first prescribed value, the boost converter can be controlled in the intermittent voltage-boosting mode. In this case, the threshold value that allows a difference between the voltage of a drive voltage system and a command voltage of the drive voltage system during voltage boosting discontinuation is set to decrease as the atmospheric pressure decreases. Consequently, the increase amount of the output voltage of the boost converter is limited during voltage boosting discontinuation in the intermittent voltage-boosting mode, so that insulation short circuit can be prevented from occurring in loading components such as an electric motor.

Preferably, when the atmospheric pressure is equal to or greater than the second prescribed value, the control device sets an upper limit value of the command voltage at a maximum value of a voltage that the boost converter can output. When the atmospheric pressure falls within the range of the first prescribed value or more and less than the second prescribed value, the control device sets the upper limit value of the command voltage based on the threshold value.

Accordingly, the upper limit value of the command voltage is set in accordance with the threshold value that allows a difference between the voltage of the drive voltage system and the command voltage of the drive voltage system during discontinuation of voltage boosting. Therefore, the output voltage of the boost converter is not excessively increased so that insulation short circuit can be prevented from occurring in loading components such as an electric motor, and also the output voltage of the boost converter is not excessively decreased so that a vehicle can be prevented from becoming unable to run.

Advantageous Effects of Invention

According to the present invention, it becomes possible to prevent impairment of a power loss reducing effect by intermittent voltage-boosting control.

DESCRIPTION OF EMBODIMENTS

First Embodiment

Figure 1:
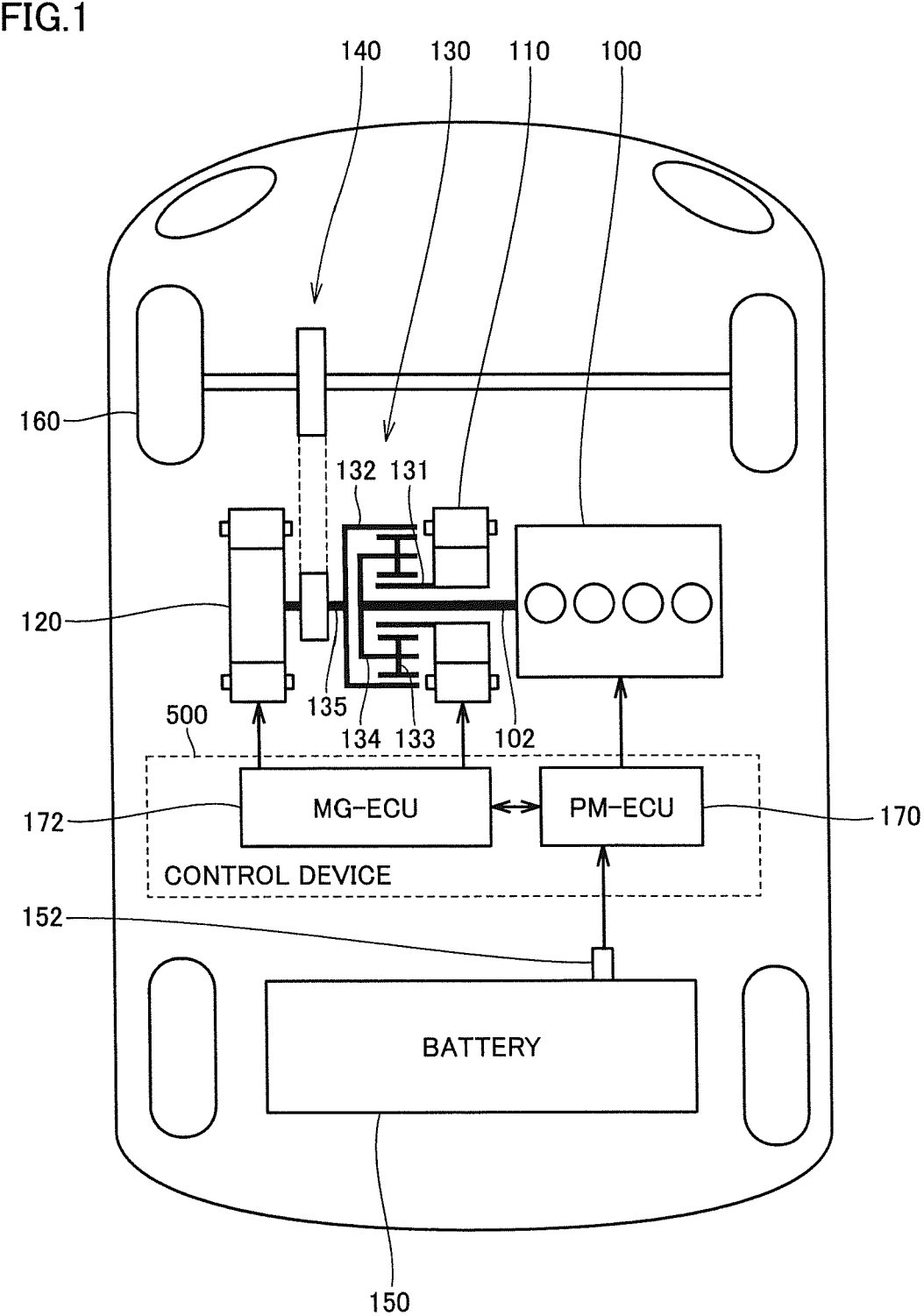
FIG. 1 is a block diagram for illustrating a configuration example of a hybrid vehicle shown as a representative example of an electrically powered vehicle according to an embodiment of the present invention.

FIG. 1 is a block diagram for illustrating a configuration example of a hybrid vehicle shown as a representative example of an electrically powered vehicle according to an embodiment of the present invention.

Referring to FIG. 1, a hybrid vehicle includes an engine 100 corresponding to an "internal combustion engine", a first MG (Motor Generator) 110, a second MG 120, a power split device 130, a reduction gear 140, a battery 150, a driving wheel 160, and a control device 500. Control device 500 includes a PM (Power Management)-ECU (Electronic Control Unit) 170 and an MG (Motor Generator)-ECU 172.

The hybrid vehicle runs by driving force from at least one of engine 100 and second MG 120. Engine 100, first MG 110 and second MG 120 are coupled to one another via power split device 130.

Power split device 130 is typically formed as a planetary gear mechanism. Power split device 130 includes a sun gear 131 that is an external gear, a ring gear 132 that is an internal gear and disposed concentrically with this sun gear 131, a plurality of pinion gears 133 that engage with sun gear 131 and also with ring gear 132, and a carrier 134. Carrier 134 is configured to hold the plurality of pinion gears 133 in a freely rotating and revolving manner.

The motive power generated by engine 100 is split into two paths by power split device 130. One of the paths serves to drive driving wheel 160 through reduction gear 140 while the other of the paths serves to drive first MG 110 to generate electric power.

First MG 110 and second MG 120 each are representatively a three-phase alternating-current (AC) rotating electric machine formed of a permanent magnet motor.

First MG 110 can mainly operate as a "power generator" to generate electric power by the driving force from engine 100 split by power split device 130. The electric power generated by first MG 110 is variously used in accordance with the running state of the vehicle and the conditions of an SOC (State of Charge) of battery 150. Then, this electric power is stored in battery 150 after its voltage is adjusted by a converter described later. In addition, in the case of motoring engine 100 at start-up of the engine, and the like, first MG 110 can also operate as an electric motor under the torque control.

Second MG 120 mainly operates as an "electric motor" and is driven by at least one of the electric power stored in battery 150 and the electric power generated by first MG 110. The motive power generated by second MG 120 is transmitted to drive shaft 135, and further transmitted to driving wheel 160 through reduction gear 140. Accordingly, second MG 120 assists engine 100, or causes the vehicle to run with the driving force from second MG 120.

During regenerative braking of a hybrid vehicle, second MG 120 is driven by driving wheel 160 through reduction gear 140. In this case, second MG 120 operates as a power generator. Accordingly, second MG 120 functions as a regenerative brake that converts braking energy into electric power. The electric power generated by second MG 120 is stored in battery 150.

Battery 150 serves as a battery pack having a configuration in which a plurality of battery modules each having a plurality of battery cells integrated with each other are connected in series. The voltage of battery 150 is approximately 200V, for example. Battery 150 can be charged with electric power generated by first MG 110 or second MG 120. The temperature, voltage and current of battery 150 are detected by a battery sensor 152. A temperature sensor, a voltage sensor and a current sensor are comprehensively indicated as battery sensor 152.

PM-ECU 170 and MG-ECU 172 each are configured to incorporate a CPU (Central Processing Unit) and a memory which are not shown, and to perform operation processing based on the value detected by each sensor by means of software processing in accordance with the map and program stored in the memory. Alternatively, at least a part of PM-ECU 170 and MG-ECU 172 may be configured to perform prescribed numerical operation processing and/or logical operation processing by means of hardware processing by a dedicated electronic circuit and the like.

Engine 100 is controlled in accordance with an operation command value from PM-ECU 170. First MG 110, second MG 120, converter 200, and inverters 210, 220 are controlled by MG-ECU 172. PM-ECU 170 and MG-ECU 172 are connected so as to allow bidirectional communication with each other.

Although PM-ECU 170 and MG-ECU 172 are formed of separate ECUs in the present embodiment, a single ECU comprehensively having both functions of these ECUs may be provided.

Figure 2:
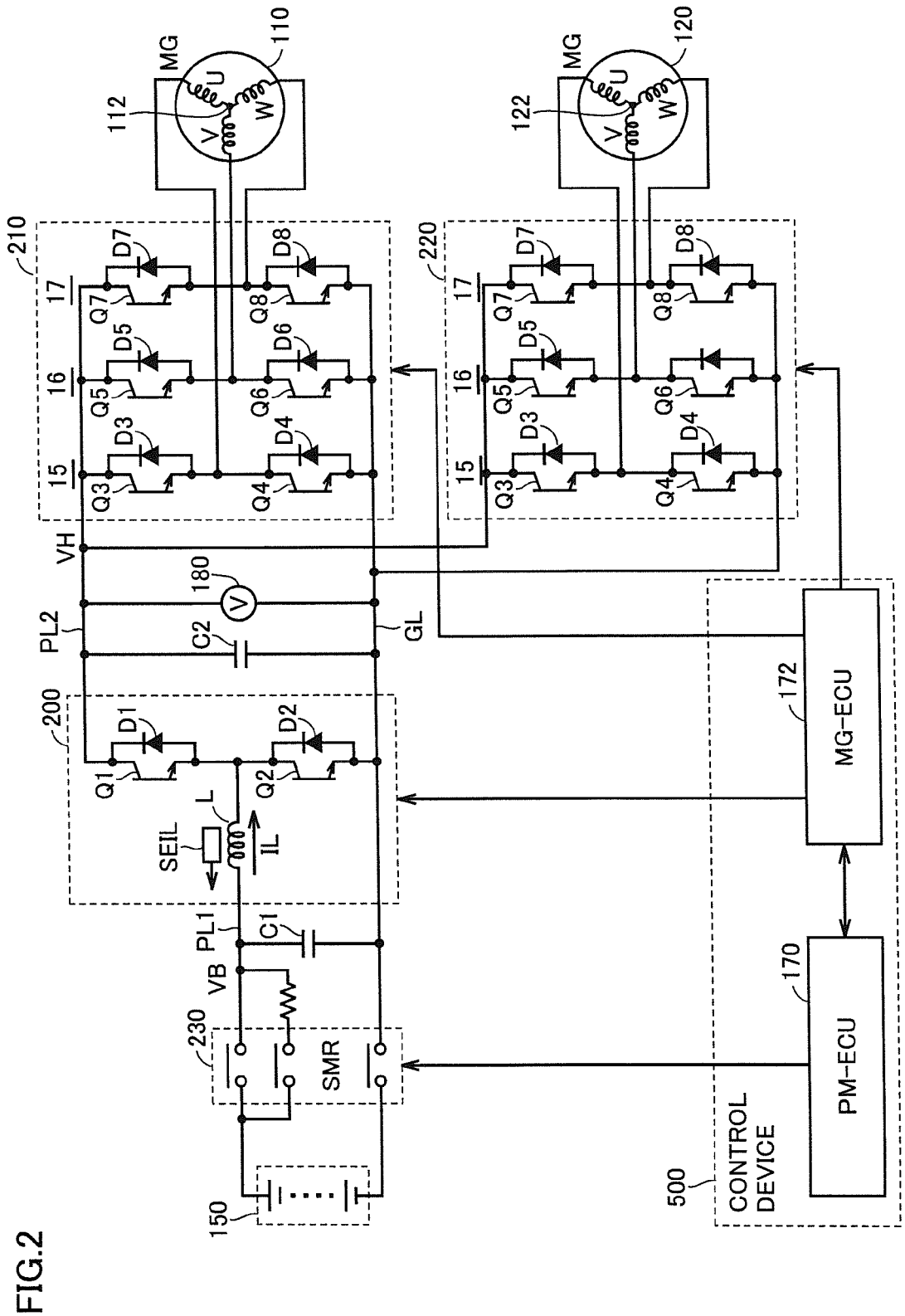
FIG. 2 is a diagram showing an electrical system of the hybrid vehicle.

FIG. 2 is a circuit diagram illustrating a configuration example of an electrical system of the hybrid vehicle shown in FIG. 1.

Referring to FIG. 2, the electrical system of the hybrid vehicle is provided with a converter 200, an inverter 210 corresponding to first MG 110, an inverter 220 corresponding to second MG 120, an SMR (System Main Relay) 230, and capacitors C1, C2.

Converter 200 includes two power semiconductor switching elements Q1 and Q2 (which will be also simply referred to as a "switching element") connected in series, diodes D1 and D2 provided corresponding to switching elements Q1 and Q2, respectively, and a reactor L.

Switching elements Q1 and Q2 are connected in series between a positive electrode line PL2 and a ground line GL connected to a negative electrode of battery 150. Switching element Q1 has a collector connected to positive electrode line PL2 while switching element Q2 has an emitter connected to ground line GL. Diodes D1 and D2 are connected in antiparallel to switching elements Q1 and Q2, respectively. Switching element Q1 and diode D1 form an upper arm of converter 200 while switching element Q2 and diode D2 form a lower arm of converter 200.

As power semiconductor switching elements Q1 and Q2, an IGBT (Insulated Gate Bipolar Transistor), a power MOS (Metal Oxide Semiconductor) transistor, a power bipolar transistor, and the like may be used as appropriate. Each of switching elements Q1 and Q2 is controlled by a switching control signal from MG-ECU 172 to be turned on or off.

Reactor L1 has one end connected to positive electrode line PL1 connected to a positive electrode of battery 150 and also has the other end connected to a connection node between switching element Q1 and switching element Q2, that is, the connection point between the emitter of switching element Q1 and the collector of switching element Q2.

Capacitor C2 is connected between positive electrode line PL2 and ground line GL. Capacitor C2 smoothes an AC component of the voltage variation between positive electrode line PL2 and ground line GL. Capacitor C1 is connected between positive electrode line PL1 and ground line GL. Capacitor C1 smoothes an AC component of the voltage variation between positive electrode line PL1 and ground line GL.

A current IL flowing through reactor L (which will be referred to as a reactor current) is detected by a current sensor SEIL. Voltage sensor 180 detects a voltage across terminals of capacitor C2 corresponding to an output voltage of converter 200, that is, a voltage VH (a system voltage or a voltage of the drive voltage system) between positive electrode line PL2 and ground line GL. Then, voltage sensor 180 outputs the detected value to MG-ECU 172.

Converter 200 is electrically connected to inverters 210 and 220 via positive electrode line PL2 and ground line GL.

During a voltage boosting operation, converter 200 boosts a direct-current (DC) voltage VB (a voltage across capacitor C1) supplied from battery 150, and supplies the boosted system voltage VH to inverters 210 and 220. More specifically, in response to a switching control signal from MG-ECU 172, the ON period of switching element Q1 and the ON period of switching element Q2 are alternately provided, and the voltage boosting ratio is in accordance with the ratio of these ON periods.

During a voltage lowering operation, converter 200 lowers system voltage VH supplied from inverters 210 and 220 through capacitor C2, and charges battery 150. More specifically, in response to a switching control signal from MG-ECU 172, the period during which only switching element Q1 is turned on and the period during which switching elements Q1 and Q2 each are turned off are alternately provided. The voltage lowering ratio is in accordance with the duty ratio of these On periods.

During discontinuation of voltage boosting and voltage lowering by converter 200, switching element Q1 is set fixed to be ON while switching element Q2 is set fixed to be OFF.

Inverter 210 is formed of a commonly-used three-phase inverter, and includes a U-phase arm 15, a V-phase arm 16, and a W-phase arm 17. Arms 15 to 17 include switching elements Q3 to Q8 and antiparallel diodes D3 to D8.

During vehicle running, inverter 210 controls the current or voltage of each phase coil of first MG 110 such that first MG 110 operates in accordance with the operation command value (representatively, a torque command value) set for generating the driving force (vehicle driving torque, power generation torque, and the like) requested for vehicle running. In other words, inverter 210 performs bidirectional DC/AC power conversion between positive electrode line PL2 and first MG 110.

As with inverter 210, inverter 220 is formed of a commonly-used three-phase inverter. During vehicle running, inverter 220 controls the current or voltage of each phase coil of second MG 120 such that second MG 120 operates in accordance with the operation command value (representatively, a torque command value) set for generating the driving force (vehicle driving torque, regenerative braking torque, and the like) requested for vehicle running. In other words, inverter 220 performs bidirectional DC/AC power conversion between positive electrode line PL and second MG 120.

Based on an accelerator pedal position Acc and a vehicle speed V of the hybrid vehicle, PM-ECU 170 calculates a torque command value TR1 of first MG 110 and a torque command value TR2 of second MG 120.

Based on torque command value TR1 of first MG 110 and torque command value TR2 of second MG 120 calculated by PM-ECU 170, a motor rotation speed MRN1 of first MG 110, and a motor rotation speed MRN2 of second MG 120, MG-ECU 172 calculates an optimum value (a target value) of the output voltage (system voltage) VH from converter 200, that is, a command voltage VH*. Based on command voltage VH* and output voltage VH of converter 200 detected by voltage sensor 180, MG-ECU 172 calculates the duty ratio for controlling output voltage VH to be command voltage VH*, and controls converter 200 based thereon.

MG-ECU 172 sets converter 200 in one of the continuous voltage-boosting mode and the intermittent voltage-boosting mode and thus controls converter 200. The continuous voltage-boosting mode is a mode in which converter 200 performs a voltage boosting operation without stopping the operation. In the continuous voltage-boosting mode, the voltage supplied from battery 150 is supplied to inverters 210 and 220 through converter 200. Therefore, this continuous voltage-boosting mode also includes the case where the voltage of battery 150 is not boosted and supplied to inverters 210 and 220 through converter 200 (that is, the duty ratio is 1).

The intermittent voltage-boosting mode is a mode in which converter 200 repeatedly starts and stops a voltage boosting operation in an intermittent manner. When converter 200 carries out the voltage boosting operation, switching elements Q1 and Q2 are switched ON and OFF. When converter 200 stops the voltage boosting operation, switching element Q1 is set fixed to be ON while switching element Q2 is set fixed to be OFF. When converter 200 stops the voltage boosting operation, the voltage of battery 150 is not supplied to inverters 210 and 220 through converter 200.

Figure 3:
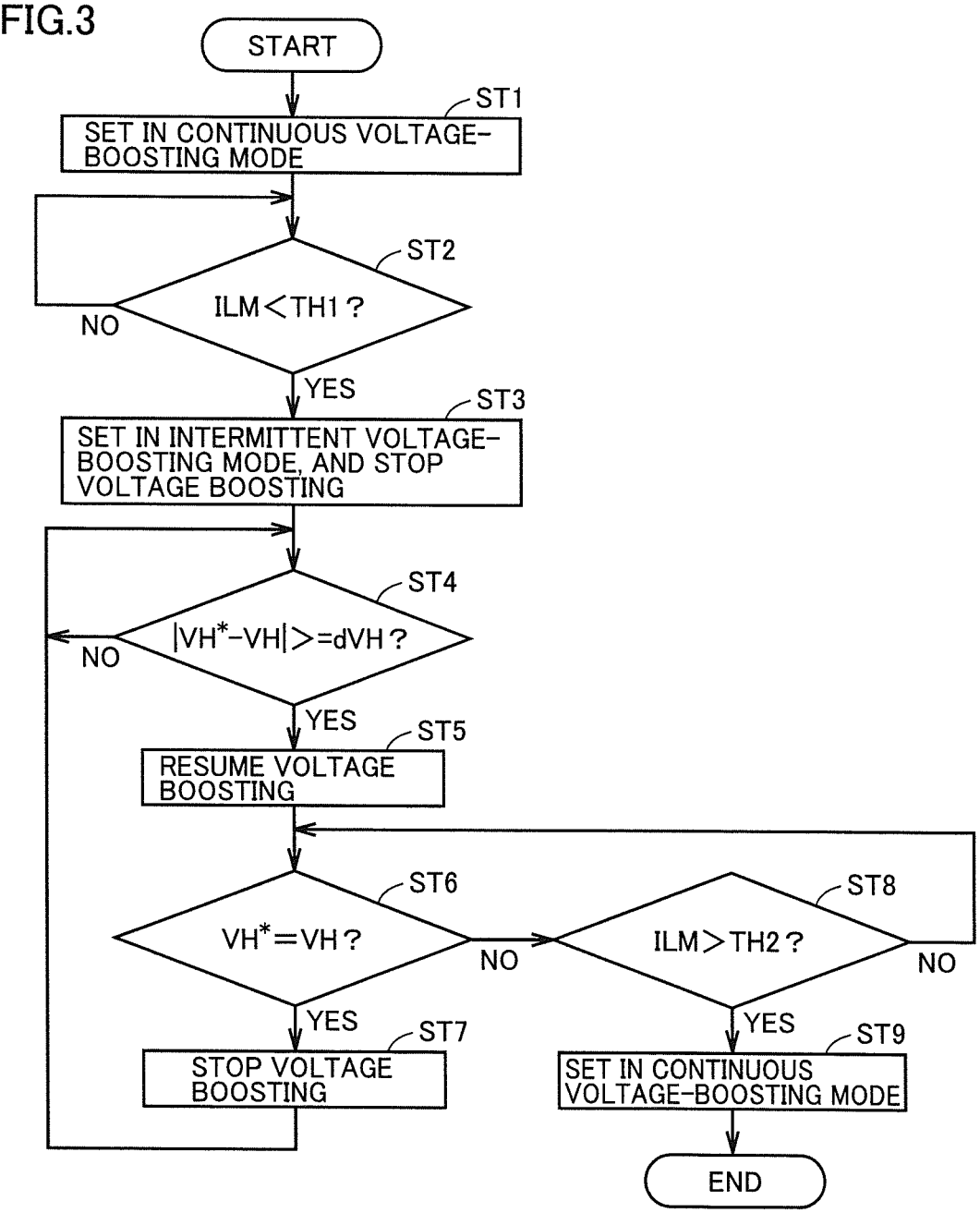
FIG. 3 is a flowchart showing the procedure of normal voltage-boosting control for a converter.

FIG. 3 is a flowchart showing the procedure of normal voltage-boosting control for converter 200. The procedure of the voltage-boosting control according to the present embodiment will be described later. FIG. 4(a) is a diagram showing an output voltage (system voltage) VH of converter 200 in the continuous voltage-boosting mode and in the intermittent voltage-boosting mode. FIG. 4(b) is a diagram showing a reactor current IL in the continuous voltage-boosting mode and the intermittent voltage-boosting mode. Although reactor current IL actually fluctuates by switching of converter 200, FIG. 4(b) shows reactor current IL that is obtained by smoothing a fluctuation component by switching. FIG. 4(c) is a diagram showing a voltage-boosting loss power amount (amount of power lost by voltage boosting) LP caused by switching in the continuous voltage-boosting mode and in the intermittent voltage-boosting mode.

Figure 4:
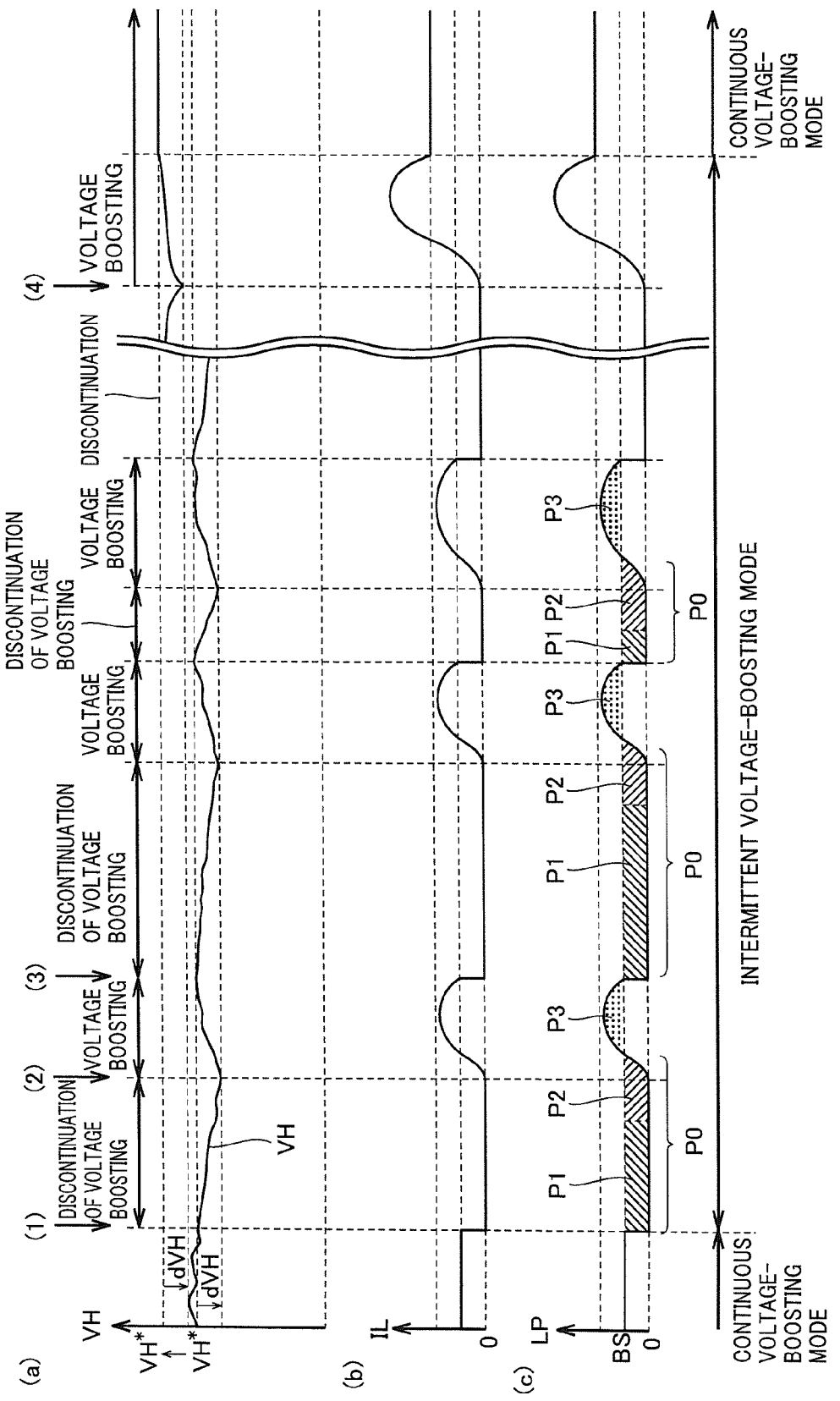
FIG. 4(a) is a diagram showing an output voltage (system voltage) VH of a converter 200 in a continuous voltage-boosting mode and in an intermittent voltage-boosting mode.
FIG. 4(b) is a diagram showing a reactor current IL in the continuous voltage-boosting mode and the intermittent voltage-boosting mode.
FIG. 4(c) is a diagram showing a voltage-boosting loss power amount LP in the continuous voltage-boosting mode and the intermittent voltage-boosting mode.

Referring to FIGS. 2, 3 and 4, control device 500 sets converter 200 in the continuous voltage-boosting mode in step ST1. Converter 200 carries out a voltage boosting operation without stopping the operation.

Then, in step ST2, when an average value ILM of reactor current IL in a past prescribed time period becomes less than a threshold value TH1, control device 500 proceeds with the process to step ST3. In step ST3, control device 500 sets converter 200 in the intermittent voltage-boosting mode. Furthermore, control device 500 stops the voltage boosting operation performed by converter 200 (for example, see a time point (1) in FIG. 4).

When the voltage boosting operation of converter 200 is stopped, no current is output from battery 150. Thereby, reactor current IL becomes zero and voltage-boosting loss power amount LP becomes zero. When the voltage boosting operation by converter 200 is stopped, first MG 110 and/or second MG 120 are/is driven by the electric power accumulated in capacitor C2. System voltage VH is to be decreased by emitting electric charge from capacitor C2.

Then, in step ST4, a deviation amount |VH*−VH| between system voltage VH and command voltage VH* is equal to or greater than a limit value dVH, control device 500 proceeds with the process to step ST5. In step ST5, control device 500 causes converter 200 to resume the voltage boosting operation (for example, see a time point (2) in FIG. 4).

When converter 200 resumes the voltage boosting operation, battery 150 supplies a current (a return current) that is required to drive first MG 110 and/or second MG 120 while charging capacitor C2. Accordingly, reactor current IL increases while voltage-boosting loss power amount LP increases.

Then, in step ST6, when system voltage VH becomes equal to command voltage VH*, control device 500 proceeds with the process to step ST7. In step ST7, control device 500 causes converter 200 to stop the voltage boosting operation (for example, see a time point (3) in FIG. 4).

On the other hand, in step ST8, when average value ILM of reactor current IL in the past prescribed time period exceeds threshold value TH2, control device 500 sets converter 200 in the continuous voltage-boosting mode (step ST9). Then, converter 200 carries out the voltage boosting operation without stopping the operation (for example, see a time point (4) in FIG. 4). FIG. 4 shows that, at the time point (4), command voltage VH* increases and reactor current IL increases.

FIG. 4(c) shows how much voltage-boosting loss power amount LP decreases assuming that one time period of voltage boosting discontinuation and the subsequent one time period of voltage boosting in the intermittent voltage-boosting mode are defined as one pair. An area P3 of a region between a line showing voltage-boosting loss power amount LP located above reference loss power BS and a line showing reference loss power BS represents a sum of voltage-boosting loss power amount LP that is increased more than that in the case of the operation in the continuous voltage-boosting mode. An area P0 of a region between a line showing voltage-boosting loss power amount LP located below reference loss power BS and a line showing reference loss power BS represents the sum of the voltage-boosting loss power amount that is decreased less than that in the case of the operation in the continuous voltage-boosting mode. A value P1 obtained by subtracting P2 (=P3) from P0 represents the sum of the voltage-boosting loss power amount that is decreased less than that in the case of the operation in the continuous voltage-boosting mode by the operation in the intermittent voltage-boosting mode during one pair of the voltage boosting discontinuation time period and the subsequent voltage boosting time period.

As shown in FIG. 4(c), the voltage-boosting loss power amount can be decreased by setting converter 200 in the intermittent voltage-boosting mode. Furthermore, the longer the voltage boosting discontinuation time period is, the more the loss reducing effect is enhanced.

Figure 5:
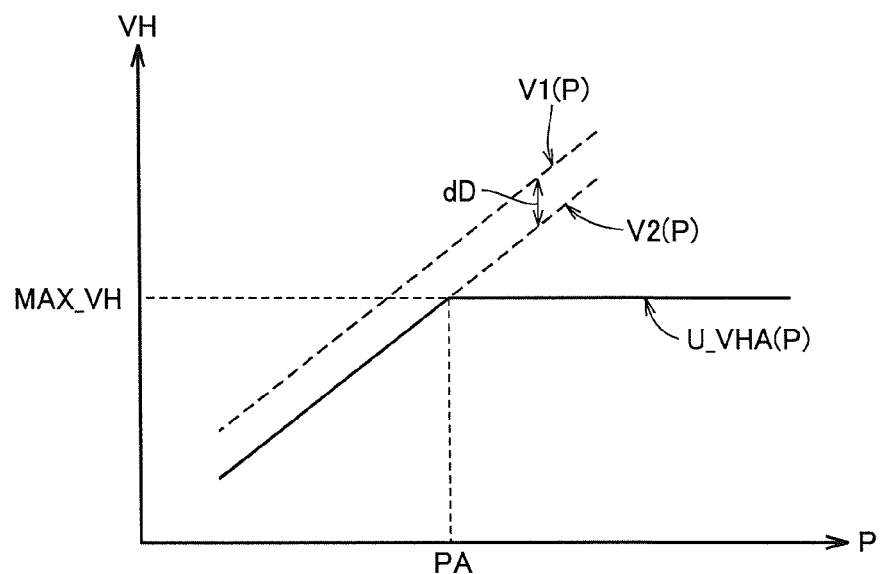
FIG. 5 is a diagram showing an example of setting an upper limit of a voltage command VH* with respect to an atmospheric pressure P in the case where the intermittent voltage-boosting mode is not provided.

FIG. 5 is a diagram showing an example of setting an upper limit of a voltage command VH* with respect to atmospheric pressure P in the case where the intermittent voltage-boosting mode is not provided.

V1(P) shows the maximum value of system voltage VH at which first MG 110 and second MG 120 are not broken under the environment of atmospheric pressure P. V2(P), which is separated by a margin from the withstand voltage of first MG 110 and second MG 120, shows a voltage that is smaller by a margin dD than the voltage on V1(P). The maximum value of system voltage VH that converter 200 can output is MAX_VH.

Therefore, the upper limit value of voltage command VH* with respect to atmospheric pressure P is set at a voltage on U_VHA(P) that represents the smaller one of V2(P) and MAX_VH (see the solid line in FIG. 5). In other words, the upper limit value of voltage command VH* is set at MAX_VH under the atmospheric pressure equal to or greater than PA. The upper limit value of voltage command VH* is set at a voltage on V2(P) under the atmospheric pressure equal to or less than PA. It is to be noted that PA is an atmospheric pressure that satisfies the condition of V2(PA)=MAX_VH.

FIG. 6(a) is a diagram showing a fluctuation of a system voltage VH during a time period of discontinuation of voltage boosting in the case of normal atmospheric pressure P.

A breakdown threshold value VH_T shows the maximum value of system voltage VH at which first MG 110 or second MG 120 is not broken. Breakdown threshold value VH_T is relatively large at normal atmospheric pressure P. Accordingly, even if system voltage VH deviates so as to be higher by dVH than the upper limit value of voltage command VH* during the time period of voltage boosting discontinuation in the intermittent voltage-boosting mode, system voltage VH does not exceed breakdown threshold value VH_T.

FIG. 6(b) is a diagram showing a fluctuation of system voltage VH during the time period of discontinuation of voltage boosting in the case where atmospheric pressure P is relatively low.

Breakdown threshold value VH_T is relatively small in the case where atmospheric pressure P is relatively low. Accordingly, when system voltage VH deviates so as to be higher by dVH than the upper limit value of voltage command VH* during the time period of voltage boosting discontinuation in the intermittent voltage-boosting mode, system voltage VH exceeds breakdown threshold value VH_T, which poses a problem that first MG 110 or second MG 120 may be broken.

Figure 6:
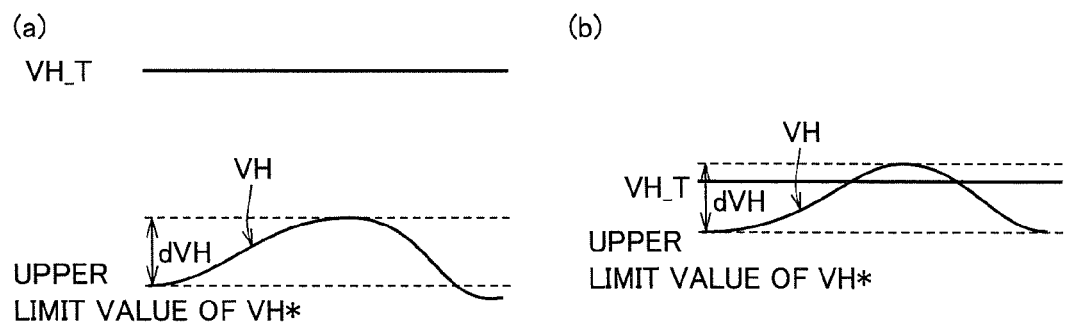
FIG. 6(a) is a diagram showing a fluctuation of a system voltage VH during a time period of discontinuation of voltage boosting in the case of normal atmospheric pressure P.
FIG. 6(b) is a diagram showing a fluctuation of system voltage VH during the time period of discontinuation of voltage boosting in the case where atmospheric pressure P is relatively low.

Then, a method for solving the problem explained with reference to FIG. 6 will be hereinafter described.

Figure 7:
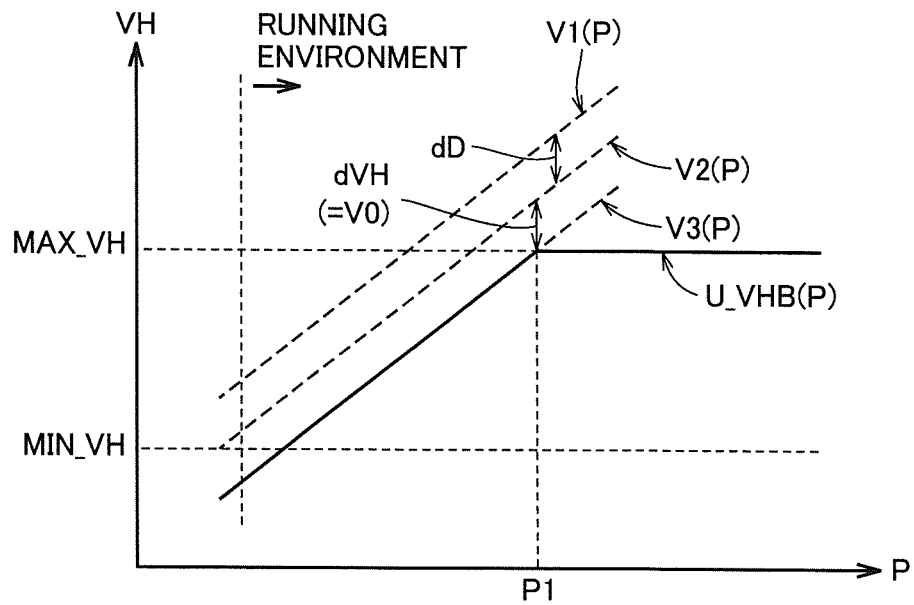
FIG. 7 is a diagram showing an example of setting the upper limit of voltage command VH* with respect to atmospheric pressure P in the case where intermittent voltage-boosting mode control is permitted in a total range of atmospheric pressure P.

FIG. 7 is a diagram showing an example of setting the upper limit of voltage command VH* with respect to atmospheric pressure P in the case where intermittent voltage-boosting mode control is permitted in a total range of atmospheric pressure P.

V1(P), V2(P), dD, and MAX_VH are identical to those shown in FIG. 5. V3(P) is a voltage that is smaller by dVH than the voltage on V2(P). dVH is a limit value at which deviation between system voltage VH and command voltage VH* is allowed during the time period of voltage boosting discontinuation in the intermittent voltage-boosting mode, and exhibits a fixed value V0.

During the time period of voltage boosting discontinuation in the intermittent voltage-boosting mode, system voltage VH may become larger by dVH than voltage command VH*. Accordingly, a conceivable method is that the upper limit value of voltage command VH* with respect to atmospheric pressure P is set at a voltage on U_VHB (P) that represents the smaller one of V3(P) and MAX_VH in the intermittent voltage-boosting mode (see the solid line in FIG. 7). In other words, according to this method, the upper limit value of voltage command VH* is set at MAX_VH at the atmospheric pressure equal to or greater than P1. The upper limit value of voltage command VH* is set at a voltage on V3(P) at the atmospheric pressure equal to or less than P1. It is to be noted that P1 is an atmospheric pressure that satisfies the condition of V3(P1)=MAX_VH. Therefore, when the upper limit value of voltage command VH* is set according to this method, there occurs no problem that first MG 110 or second MG 120 is broken as have been explained with reference to FIG. 6.

However, when atmospheric pressure P is decreased, the voltage represented on V3(P) becomes smaller than a minimum value MIN_VH of system voltage VH at which a vehicle can run. This results in a problem that a vehicle stops running when this vehicle moves to a position where atmospheric pressure P is relatively low.

Figure 8:
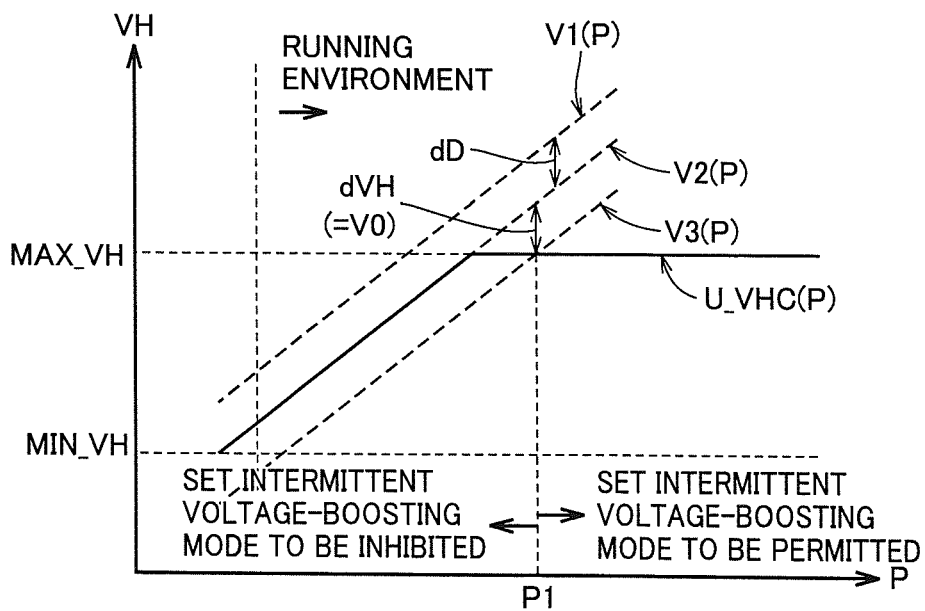
FIG. 8 is a diagram showing an example of setting the upper limit of voltage command VH* with respect to atmospheric pressure P in the first embodiment.

FIG. 8 is a diagram showing an example of setting the upper limit of voltage command VH* with respect to atmospheric pressure P in the first embodiment.

V1(P), V2(P), V3(P), dD, and MAX_VH are identical to those shown in FIGS. 5 and 7. According to the first embodiment, when atmospheric pressure P becomes less than P1, intermittent voltage-boosting mode control is set to be inhibited in order to avoid a problem that a vehicle stops running when it moves to a position where atmospheric pressure P is relatively low, as having been explained with reference to FIG. 7. When atmospheric pressure P is equal to or higher than P1, the intermittent voltage-boosting mode control is set to be permitted.

The upper limit value of voltage command VH* with respect to atmospheric pressure P is set at a voltage on U_VHC(P) (see the solid line in FIG. 8). In other words, in the range in which intermittent voltage-boosting mode control is set to be permitted (P>=P1), the upper limit value of voltage command VH* with respect to atmospheric pressure P is set at MAX_VH that is the smaller one of V3(P) and MAX_VH. In the range in which intermittent voltage-boosting mode control is set to be inhibited (P<P1), the upper limit value of voltage command VH* with respect to atmospheric pressure P is set at a voltage that is the smaller one of V2(P) and MAX_VH. Consequently, at atmospheric pressure P in the vehicle running environment, the upper limit value of voltage command VH* does not become smaller than minimum value MIN_VH of system voltage VH at which a vehicle can run, so that the vehicle can be prevented from stopping running.

Figure 9:
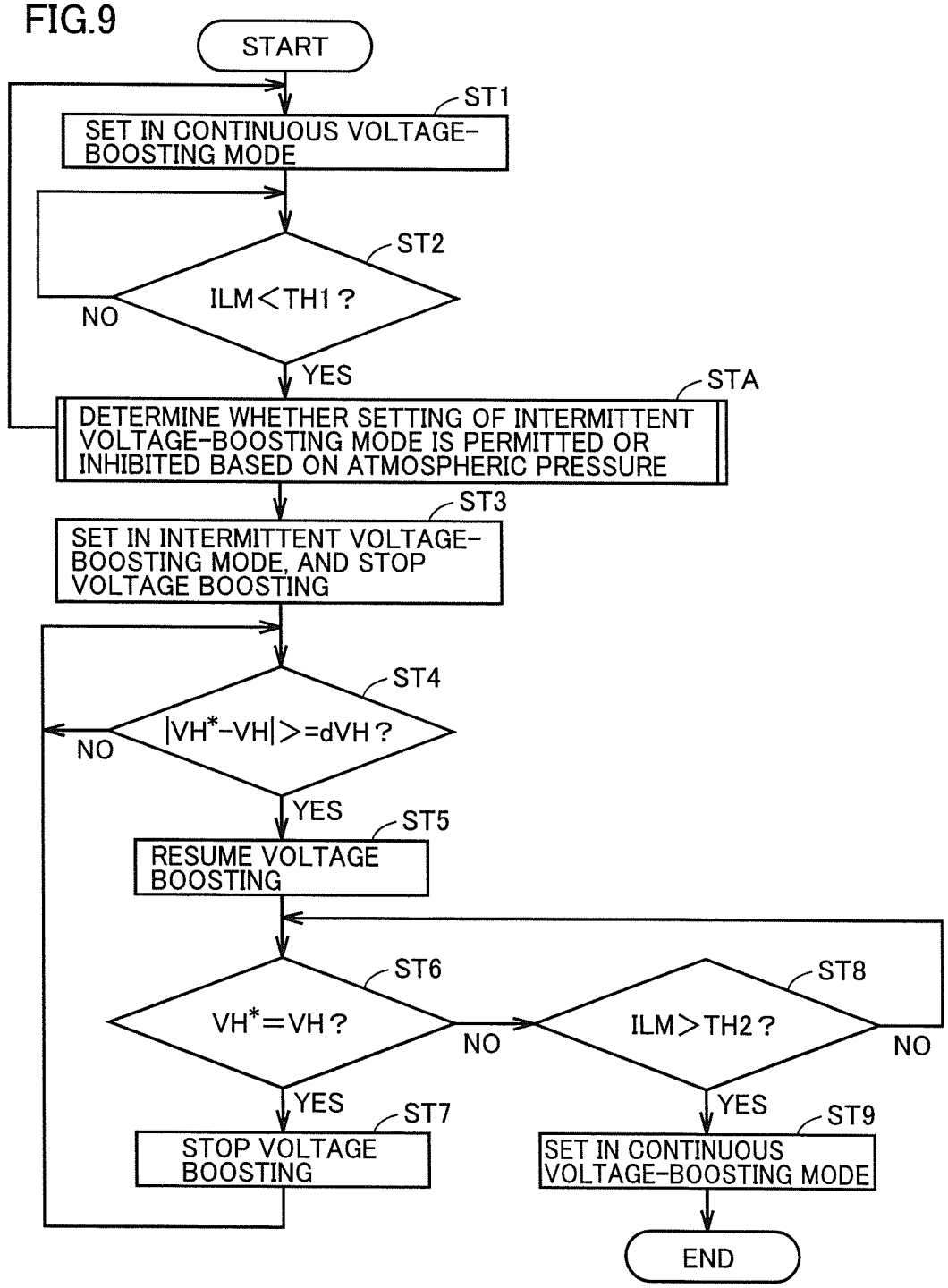
FIG. 9 is a flowchart showing the procedure of voltage-boosting control for the converter in the first embodiment.
Figure 10:
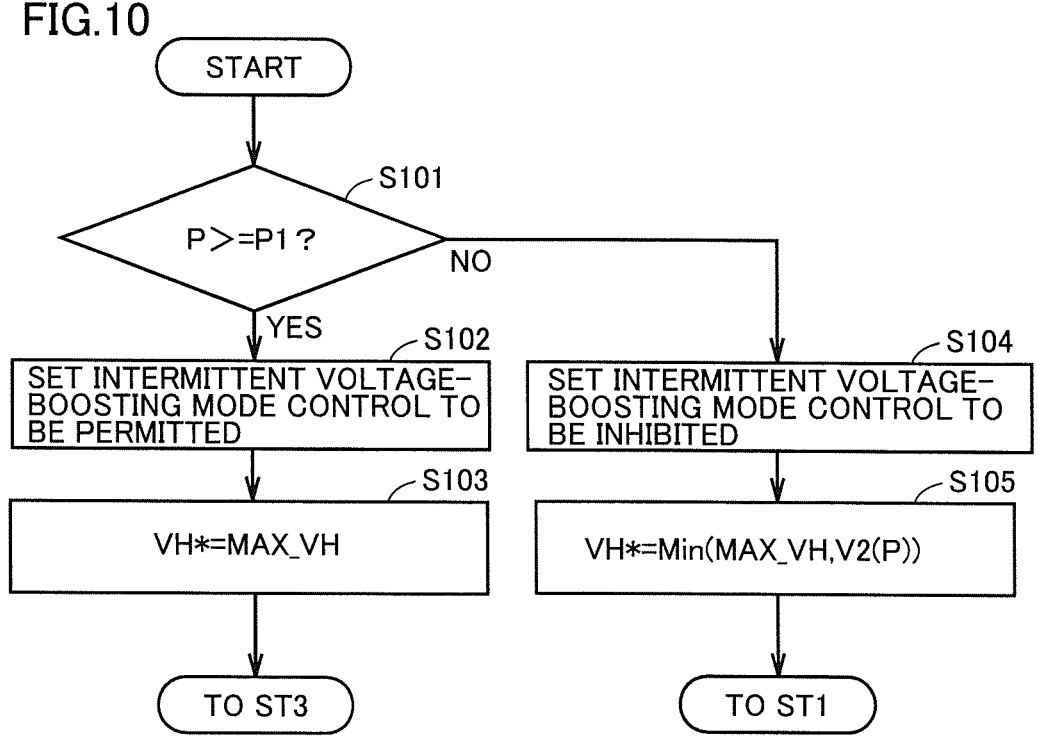
FIG. 10 is a flowchart showing the procedure of step STA in FIG. 9.

FIG. 9 is a flowchart showing the procedure of voltage-boosting control for converter 200 in the first embodiment. The flowchart in FIG. 9 is different from the flowchart in FIG. 3 in that step STA is included between step ST2 and step ST3. FIG. 10 is a flowchart showing the procedure of step STA.

Referring to FIG. 10, in step S101, when atmospheric pressure P is equal to or greater than P1, the process proceed to step S102; and when atmospheric pressure P is less than P1, the process proceeds to step S104.

In step S102, control device 500 sets the intermittent voltage-boosting mode control to be permitted. Then, in step S103, control device 500 sets the upper limit value of voltage command VH* with respect to atmospheric pressure P at MAX_VH that is the smaller one of V3(P) and MAX_VH shown in FIG. 8. Then, control device 500 proceeds with the process to step ST3 in FIG. 9.

In step S104, control device 500 sets the intermittent voltage-boosting mode control to be inhibited. Then, in step S105, control device 500 sets the upper limit value of voltage command VH* with respect to atmospheric pressure P at a voltage that is the smaller one of V2(P) and MAX_VH shown in FIG. 8, and then, proceeds with the process to step ST1 in FIG. 9.

As described above, according to the present embodiment, intermittent voltage-boosting control is not carried out in an environment in which atmospheric pressure P is relatively low (P<P1). Accordingly, system voltage VH does not exceed breakdown threshold value VH_T, so that first MG 110 or second MG 120 can be prevented from being broken, and that a vehicle can run even at a relatively low atmospheric pressure.

Second Embodiment

In the first embodiment, limit value dVH at which a deviation between system voltage VH and command voltage VH* is allowed is defined as fixed value V0 during the time period of voltage boosting discontinuation in the intermittent voltage-boosting mode. In contrast to this, it is conceivable that dVH is decreased less than V0 when the atmospheric pressure decreases, thereby preventing system voltage VH from exceeding breakdown threshold value VH_T. However, if dVH is excessively decreased, the frequency of resuming voltage boosting by converter 200 is increased, with the result that the effect of reducing loss power cannot be achieved. According to the second embodiment, dVH is decreased when the atmospheric pressure is relatively low, thereby preventing system voltage VH from exceeding failure threshold value VH_T during discontinuation of voltage boosting by converter 200, and also ensuring the loss power reducing effect.

Figure 11:
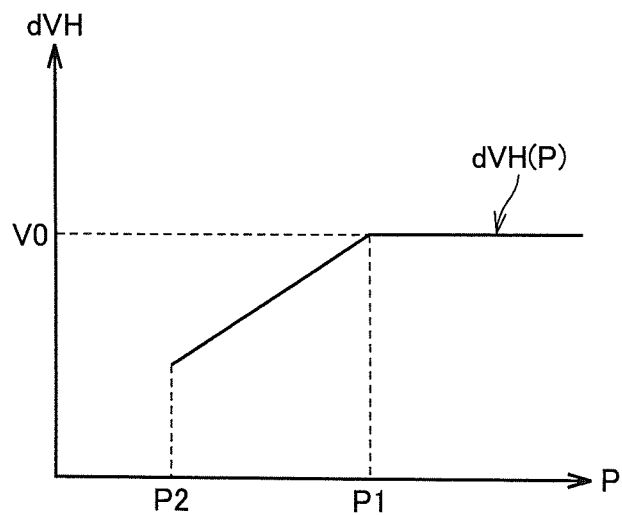
FIG. 11 is a diagram showing an example of setting a limit value dVH in the intermittent voltage-boosting mode with respect to atmospheric pressure P in the second embodiment.

FIG. 11 is a diagram showing an example of setting limit value dVH in the intermittent voltage-boosting mode with respect to atmospheric pressure P in the second embodiment.

In the range of P>=P1, dVH(P) is set at fixed value V0 as in the first embodiment. P1 is the same as P1 (that satisfies the condition of V3(P1)=MAX_VH) in the first embodiment. In the range of P2<=P<P1, dVH(P) linearly increases. The intermittent voltage-boosting mode is inhibited from being set in the range of P<P2. Therefore, dVH(P) is not set.

The inclination of VH(P) in the range of P2 and P2<=P<P1 is set by experimentally specifying such a value as preventing impairment of the loss power reducing effect by the intermittent voltage-boosting mode and also preventing a vehicle from stopping running.

Figure 12:
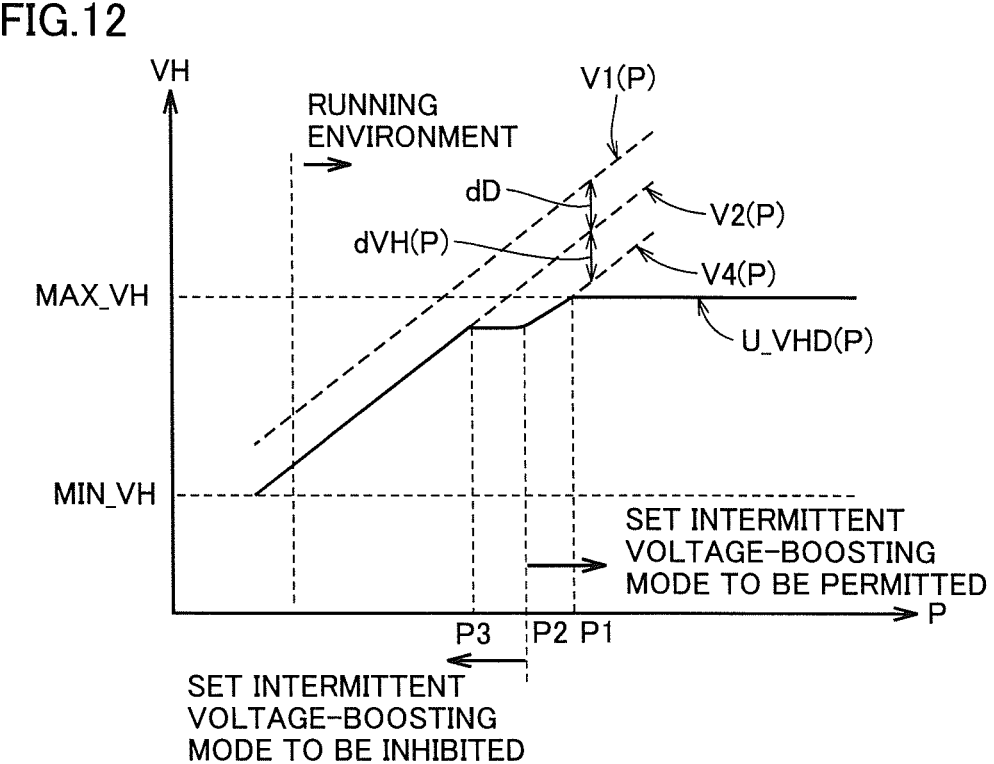
FIG. 12 is a diagram showing an example of setting the upper limit of voltage command VH* with respect to atmospheric pressure P in the second embodiment.

FIG. 12 is a diagram showing an example of setting the upper limit of voltage command VH* with respect to atmospheric pressure P in the second embodiment.

V1(P) shows the maximum value of system voltage VH at which first MG 110 or second MG 120 is not broken under the environment of atmospheric pressure P. V2(P), which is separated by a margin from the withstand voltage of first MG 110 or second MG 120, shows a voltage that is smaller by margin dD than the voltage on V1(P). The maximum value of system voltage VH that converter 200 can output is MAX_VH. V4(P) is a voltage that is smaller by dVH(P) shown in FIG. 11 than the voltage on V2(P).

When atmospheric pressure P becomes less than P2, intermittent voltage-boosting mode control is set to be inhibited, in order to avoid a problem that a vehicle stops running when it moves to a position where atmospheric pressure P is relatively low. When atmospheric pressure P is equal to or greater than P2, intermittent voltage-boosting mode control is set to be permitted.

The upper limit value of voltage command VH* with respect to atmospheric pressure P is set at a voltage on U_VHD(P) (see the solid line in FIG. 12). In other words, in the range in which intermittent voltage-boosting mode control is set to be permitted (P>=P2), the upper limit value of voltage command VH* with respect to atmospheric pressure P is set at the smaller one of V4(P) and MAX_VH.

In the range of P3<=P<P2 included in the range in which intermittent voltage-boosting mode control is set to be inhibited (P<P2), the upper limit value of voltage command VH* with respect to atmospheric pressure P can also be set at V2(P) that is the smaller voltage of V2(P) and MAX_VH. In this case, however, this upper limit value is to exceed upper limit value U_VHD(P2) of voltage command VH* at P2, thereby causing a reversal phenomenon. Thus, the upper limit value of voltage command VH* in this range is set to be the same as the upper limit value of the voltage command at P2. In this case, P3 is a value that satisfies the condition of V2(P3)=U_VHD(P2).

In the range of P<P3, the upper limit value of voltage command VH* with respect to atmospheric pressure P is set at V2(P) that is the smaller voltage of V2(P) and MAX_VH. Accordingly, the upper limit value of voltage command VH* does not become smaller than minimum value MIN_VH of system voltage VH in the range of atmospheric pressure P in which a vehicle is assumed to run, so that a vehicle can be prevented from stopping running.

Figure 13:
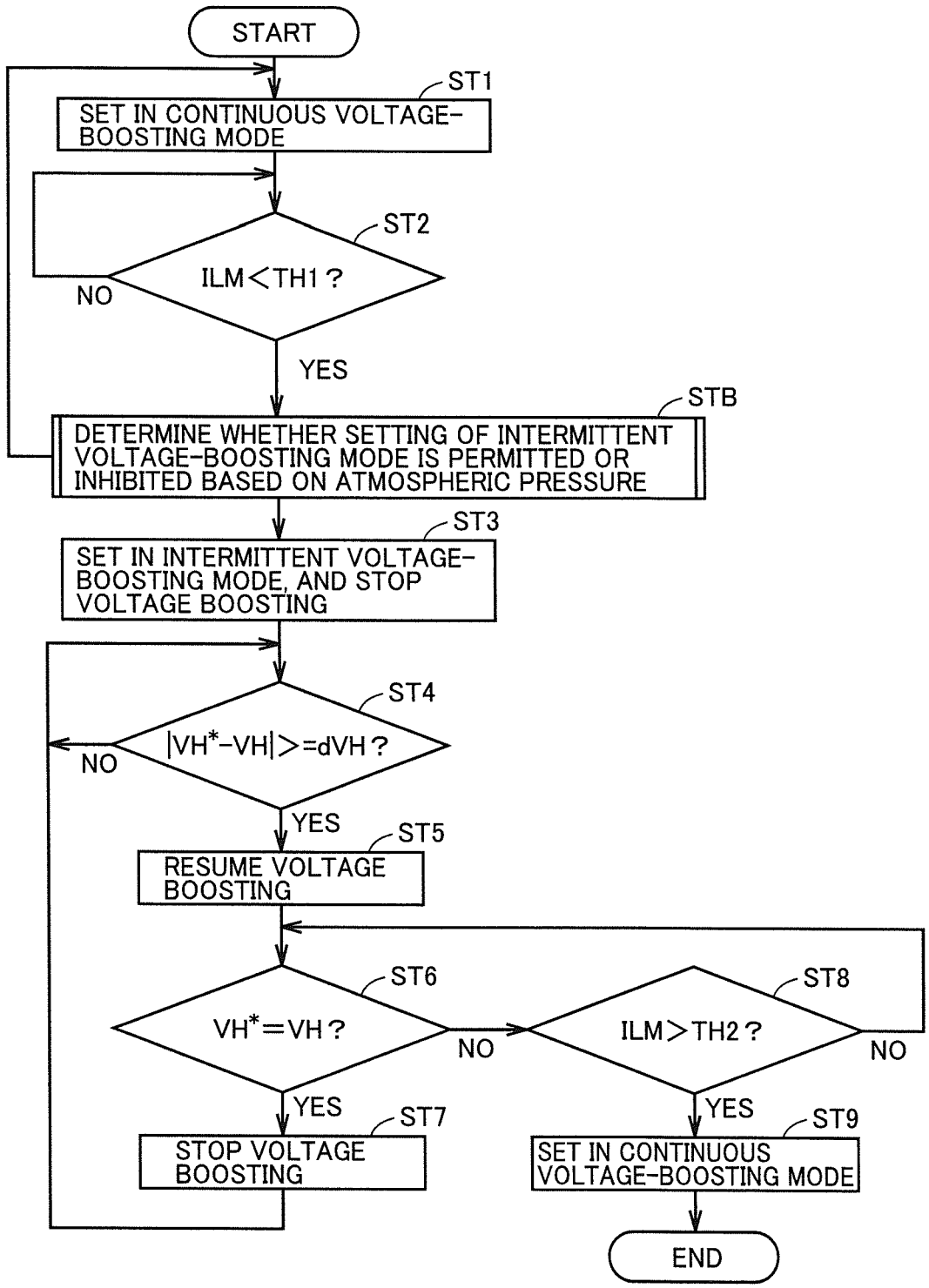
FIG. 13 is a flowchart showing the procedure of voltage-boosting control for a converter in the second embodiment.
Figure 14:
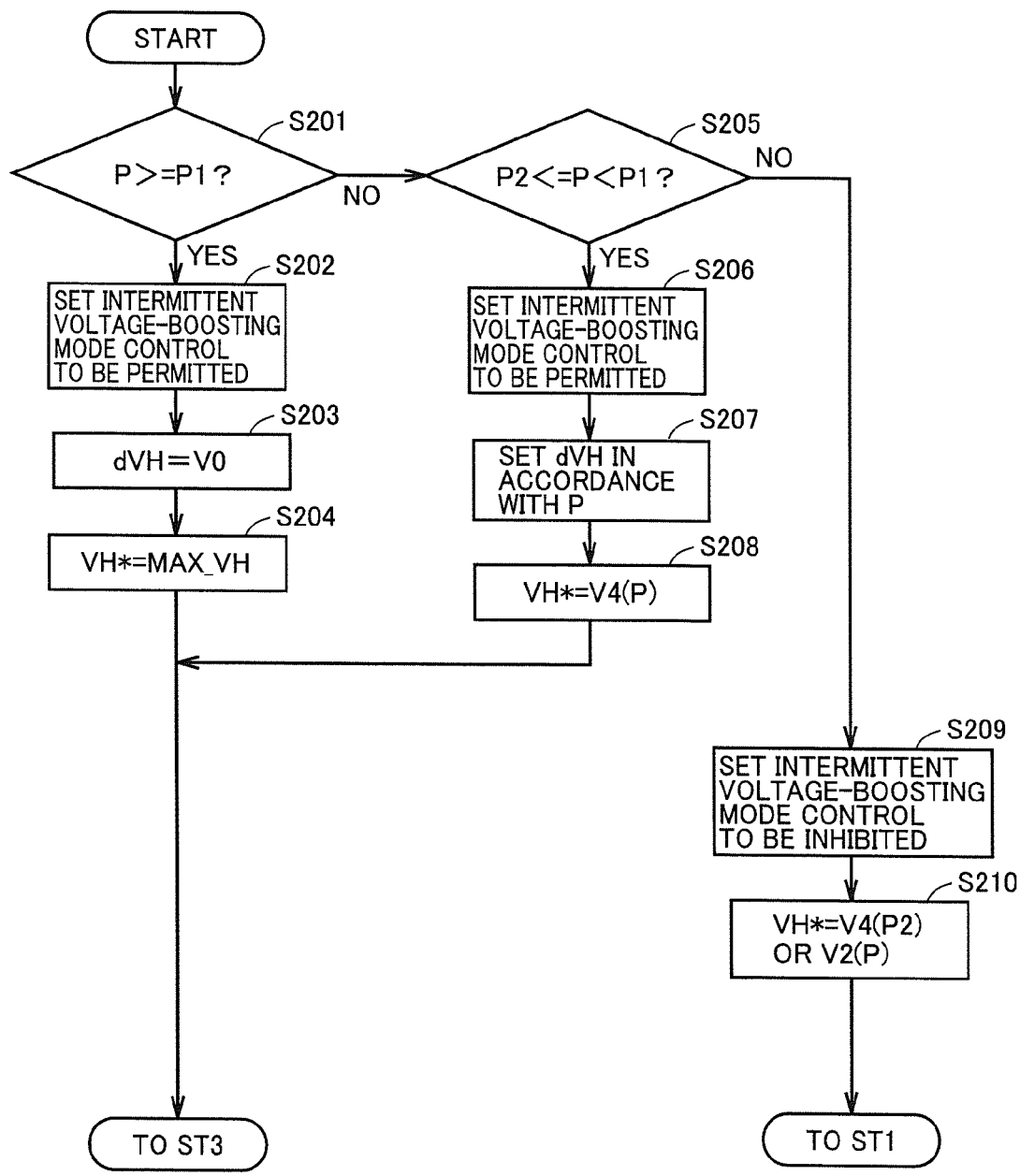
FIG. 14 is a flowchart showing the procedure of step STB in FIG. 13.

FIG. 13 is a flowchart showing the procedure of voltage-boosting control for converter 200 in the second embodiment. The flowchart in FIG. 13 is different from the flowchart in FIG. 3 in that step STB is included between step ST2 and step ST3. FIG. 14 is a flowchart showing the procedure of step STB.

Referring to FIG. 14, in step S201, when atmospheric pressure P is equal to or higher than P1, the process proceeds to step S202; and when atmospheric pressure P is less than P1, the process proceeds to step S205.

In step S202, control device 500 sets the intermittent voltage-boosting mode control to be permitted. Then, in step S203, control device 500 sets dVH in the intermittent voltage-boosting mode at fixed value V0 shown in FIG. 11. Then, in step S204, control device 500 sets the upper limit value of voltage command VH* with respect to atmospheric pressure P at MAX_VH that is the smaller one of V4(P) and MAX_VH shown in FIG. 12. Then, control device 500 proceeds with the process to step ST3 in FIG. 13.

In step S205, when atmospheric pressure P is less than P1 and equal to or higher than P2, the process proceeds to step S206; and when atmospheric pressure P is less than P2, the process proceeds to step S209.

In step S206, control device 500 sets the intermittent voltage-boosting mode control to be permitted. Then, in step S207, control device 500 sets dVH in the intermittent voltage-boosting mode at a value that is smaller than fixed value V0 and decreases as atmospheric pressure P decreases, as shown in FIG. 11. Then, in step S208, control device 500 sets the upper limit value of voltage command VH* with respect to atmospheric pressure P at V4(P) that is the smaller one of V4(P) and MAX_VH shown in FIG. 12. Then, control device 500 proceeds with the process to step ST3 in FIG. 13.

In step S209, control device 500 sets intermittent voltage-boosting mode control to be inhibited. Then, in step S210, control device 500 sets the upper limit value of voltage command VH* with respect to atmospheric pressure P at V4(P2) (in the case of a range of P3<=P<P2) or at V2(P) (in the case of P<P3) as shown in FIG. 12. Then, control device 500 proceeds with the process to step ST1 in FIG. 13.

As described above, according to the present embodiment, under an environment in which atmospheric pressure P is relatively low (P<P2), intermittent voltage-boosting control is not carried out. Accordingly, system voltage VH does not exceed breakdown threshold value VH_T, so that first MG 110 or second MG 120 can be prevented from being broken, and that a vehicle can run even under an environment of a relatively low atmospheric pressure.

Furthermore, dVH in the intermittent voltage-boosting mode is set to decrease as atmospheric pressure P decreases under the environment of P2<=P<P1. Accordingly, as atmospheric pressure P becomes lower, the increase allowable amount of system voltage VH during discontinuation of voltage boosting can be reduced, and thus, system voltage VH can be prevented from exceeding breakdown threshold value VH_T. Furthermore, by setting the upper limit value of command voltage VH* at a value in accordance with dVH under the environment of P2<=P<P1, it becomes possible to prevent occurrence of such states that command voltage VH* excessively increases and thereby system voltage VH exceeds breakdown threshold value VH_T, and that command voltage VH* excessively decreases and thereby a vehicle becomes unable to run.

The present invention is not limited to the above-described embodiments. For example, in the embodiments of the present invention, when the intermittent voltage-boosting mode control is set to be inhibited, a converter is to be operated in the continuous voltage-boosting mode, but the present invention is not limited thereto. Even in the case where the intermittent voltage-boosting mode control is set to be inhibited, the converter is caused to perform voltage lowering when voltage boosting is not required but voltage lowering is required; and the converter is caused to stop voltage boosting/voltage lowering when voltage boosting/voltage lowering is not required.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

REFERENCE SIGNS LIST 100 engine, 110 first MG, 120 second MG, 112, 122 neutral point, 130 power split device, 131 sun gear, 132 ring gear, 133 pinion gear, 134 carrier, 135 ring gear shaft (drive shaft), 140 reduction gear, 150 battery, 152 battery sensor, 160 driving wheel, 170 PM-ECU, 172 MG-ECU, 180 voltage sensor, 200 converter, 210, 220 inverter, 230 SMR, 500 control device, PL1, PL2 positive electrode line, GL ground line, Q1 to Q8 switching element, D1 to D8 diode, C1, C2 capacitor, L reactor.

The invention claimed is:

1. A power supply device of a vehicle, said power supply device comprising:
   a power storage device;
   an electric motor;
   a boost converter connected to said power storage device and said electric motor, boosting a voltage of said power storage device, and supplying the boosted voltage to said electric motor; and
   a control device controlling said boost converter to be operated in one of a continuous voltage-boosting mode in which said boost converter is continuously operated and an intermittent voltage-boosting mode in which said boost converter is intermittently operated,
   said control device permitting said boost converter to be controlled in said intermittent voltage-boosting mode when an atmospheric pressure P is equal to or greater than a first prescribed value P1, and inhibiting said boost converter from being controlled in said intermittent voltage-boosting mode when said atmospheric pressure P is less than said first prescribed value P1,
   assuming that a maximum value of an output voltage of said boost converter at which said electric motor is not broken under an environment of atmospheric pressure P is defined as V1(P), on conditions of V2(P)=V1(P)−ΔD and V3(P)=V2(P)−ΔVH, said first prescribed value P1 satisfying a condition of V3(P1)=MAX_VH, in which ΔD shows a margin for a withstand voltage of said electric motor, ΔVH shows a limit value at which a deviation between the output voltage of the boost converter and a command voltage of the output voltage of said boost converter is allowed, and MAX_VH shows a maximum value of the output voltage that can be output from said boost converter.

2. A power supply device of a vehicle, said power supply device comprising:
   a power storage device;
   an electric motor;
   a boost converter connected to said power storage device and said electric motor, boosting a voltage of said power storage device, and supplying the boosted voltage to said electric motor; and
   a control device controlling said boost converter to be operated in one of a continuous voltage-boosting mode in which said boost converter is continuously operated and an intermittent voltage-boosting mode in which said boost converter is intermittently operated,
   said control device permitting said boost converter to be controlled in said intermittent voltage-boosting mode when an atmospheric pressure P is equal to or greater than a first prescribed value P2, and inhibiting said boost converter from being controlled in said intermittent voltage-boosting mode when said atmospheric pressure P is less than said first prescribed value P2,
   when a difference between an output voltage of said boost converter and a command voltage of the output voltage of said boost converter is equal to or greater than a limit value ΔVH(P) during discontinuation of voltage boosting by said boost converter in said intermittent voltage-boosting mode, said control device causing said boost converter to resume voltage boosting,
   when said atmospheric pressure P is equal to or greater than a second prescribed value P1 that is greater than said first prescribed value P2, said control device setting said limit value ΔVH(P) at a fixed value V0,
   when said atmospheric pressure P falls within a range of said first prescribed value P2 or more and less than said second prescribed value P1, said control device setting said limit value ΔVH(P) at a value that is equal to or less than said fixed value V0 and decreases as said atmospheric pressure P decreases,
   assuming that a maximum value of an output voltage of said boost converter at which said electric motor is not broken under an environment of atmospheric pressure P is defined as V1(P), on conditions of V2(P)=V1(P)−ΔD and V4(P)=V2(P)−ΔVH(P), a condition of ΔVH(P)=V0 (fixed value) being satisfied in a range of P1≤P, and ΔVH(P) linearly increasing as P increases in a range of P2≤P<P1,
   said second prescribed value P1 satisfying a condition of V4(P1)=MAX_VH, in which ΔD shows a margin for a withstand voltage of said electric motor, said limit value ΔVH(P) shows a limit value at which a deviation between the output voltage of the boost converter and a command voltage of the output voltage of said boost converter is allowed, and MAX_VH shows a maximum value of the output voltage that can be output from said boost converter.

3. The power supply device of a vehicle according to claim 2, wherein
   when said atmospheric pressure P is equal to or greater than said second prescribed value P1, said control device sets an upper limit value of said command voltage at a maximum value MAX_VH of a voltage that said boost converter can output, and
   when said atmospheric pressure P falls within the range of said first prescribed value P2 or more and less than said second prescribed value P1, said control device sets the upper limit value of said command voltage based on said limit value ΔVH(P).

* * * * *